US010078196B2

(12) United States Patent
Hwang et al.

(10) Patent No.: US 10,078,196 B2
(45) Date of Patent: Sep. 18, 2018

(54) CAMERA MODULE INCLUDING MULTI-LENS AND ELECTRONIC DEVICE HAVING THE SAME (71) Applicant: Samsung Electronics Co., Ltd., Suwon-si, Gyeonggi-do (KR)

(72) Inventors: Youngjae Hwang, Suwonsi (KR); Kwangseok Byon, Yongin-si (KR); Jungsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/262,630

(22) Filed: Sep. 12, 2016

(65) Prior Publication Data
US 2017/0082823 A1 Mar. 23, 2017

(30) Foreign Application Priority Data

Sep. 17, 2015 (KR) ........................ 10-2015-0131692

(51) Int. Cl.
*G02B 7/02* (2006.01)
*G02B 7/08* (2006.01)
*G02B 27/64* (2006.01)
*H04N 5/225* (2006.01)
*H04N 5/232* (2006.01)
*H04N 5/238* (2006.01)

(52) U.S. Cl.
CPC ............... *G02B 7/021* (2013.01); *G02B 7/08* (2013.01); *G02B 27/646* (2013.01); *H04N 5/2258* (2013.01); *H04N 5/238* (2013.01); *H04N 5/23287* (2013.01)

(58) Field of Classification Search
CPC ..................................... G02B 7/021
See application file for complete search history.

(56) References Cited

U.S. PATENT DOCUMENTS

| 8,594,493 B2 * | 11/2013 | Kwon .................. G02B 27/646 396/55 |
| 8,743,179 B2 | 6/2014 | Ryu et al. |
| 8,792,782 B1 * | 7/2014 | Cheng .................... G02B 15/04 396/75 |
| 8,818,181 B1 | 8/2014 | Hwang et al. |

(Continued)

FOREIGN PATENT DOCUMENTS

| EP | 3166303 A1 * | 5/2017 | .......... H04N 5/2258 |
| KR | 10-0932175 B1 | 12/2009 | |

(Continued)

*Primary Examiner* — Cynthia Segura
(74) *Attorney, Agent, or Firm* — Jefferson IP Law, LLP (57) ABSTRACT A camera and an electronic device are provided. The camera or the electronic device generally includes a plurality of lens barrels configured to include a plurality of lenses, and a moving frame. The moving frame is configured to launch the plurality of lens barrels, move the plurality of lens barrels in an optical axis direction, and move the plurality of lens barrels in a direction at least one of a first direction and a second direction perpendicular to the optical axis. The camera or the electronic device may further include a fixed frame configured to movably support the moving frame, and a base. The base is configured to fix the fixed frame and includes a plurality of image sensors displaced from the plurality of lenses in the optical axis direction.

19 Claims, 8 Drawing Sheets

(56) References Cited

U.S. PATENT DOCUMENTS

| | | | |
|---|---|---|---|
| 9,025,077 B2 | 5/2015 | Attar et al. | |
| 9,438,801 B2 | 9/2016 | Hwang et al. | |
| 9,531,954 B2* | 12/2016 | Dong | H04N 5/23287 |
| 2011/0216641 A1* | 9/2011 | Hato | G11B 7/135 |
| | | | 369/112.23 |
| 2012/0140087 A1* | 6/2012 | Ku | H04N 5/23287 |
| | | | 348/208.7 |
| 2013/0141541 A1* | 6/2013 | Jung | G03B 35/08 |
| | | | 348/46 |
| 2013/0265394 A1 | 10/2013 | Lim | |
| 2014/0355118 A1 | 12/2014 | Park et al. | |
| 2015/0070781 A1 | 3/2015 | Cheng et al. | |
| 2015/0124083 A1 | 5/2015 | Attar et al. | |
| 2015/0201128 A1 | 7/2015 | Dong | |
| 2015/0316745 A1* | 11/2015 | Chen | H02K 41/035 |
| | | | 359/824 |
| 2017/0094187 A1* | 3/2017 | Sharma | G02B 7/09 |
| 2017/0134628 A1* | 5/2017 | Hwang | H04N 5/2258 |
| 2018/0031860 A1* | 2/2018 | Bachar | G02B 27/646 |

FOREIGN PATENT DOCUMENTS

| | | |
|---|---|---|
| KR | 10-1182549 B1 | 9/2012 |
| KR | 10-2013-0081398 A | 7/2013 |
| KR | 10-1459753 B1 | 11/2014 |
| KR | 10-2015-0020951 A | 2/2015 |

\* cited by examiner

CAMERA MODULE INCLUDING MULTI-LENS AND ELECTRONIC DEVICE HAVING THE SAME

CROSS-REFERENCE TO RELATED APPLICATION(S)

This application claims the benefit under 35 U.S.C. § 119(a) of a Korean patent application filed on Sep. 17, 2015 in the Korean Intellectual Property Office and assigned Serial number 10-2015-0131692, the entire disclosure of which is hereby incorporated by reference.

TECHNICAL FIELD

The present disclosure relates to a camera module including a plurality of lenses and an electronic device having the same.

BACKGROUND

Supply and usage of electronic devices are rapidly increasing in accordance with dramatic developments in information and communication technology and semiconductor technology. Further, recently introduced electronic devices are not confined to their own traditional areas and there is a movement towards convergence of various terminals. For example, as well as providing general communication functions such as voice communication and message exchange, mobile terminals also provide various functions such as a television (TV) reception (for example, digital multimedia broadcasting (DMB) or digital video broadcasting (DVB)), music play (for example, Moving Picture Experts Group phase 1 or phase 2 (MPEG-1 or MPEG-2) audio layer 3 (MP3)), internet connection, and radio reception.

In the meantime, recently introduced electronic devices provide a camera function that can store an image of a subject in a photo or digital video file. Recently there has been an increased demand from consumers for high quality still images or video files. In order to satisfy consumer demand, electronic devices have been launched with high resolution camera modules. Further, the electronic devices may provide an auto focus (AF) function for setting the focus automatically and an optical image stabilizer (OIS) function for preventing a deterioration of image clarity because of shaking of the user's hand.

In order to provide electronic devices with a high performance camera module, the size of the camera module generally has to be increased. However, it is difficult to apply a high performance camera module to a slim electronic device due to the limited space that is available and recent trends have been directed toward ever slimmer electronic devices.

The above information is presented as background information only to assist with an understanding of the present disclosure. No determination has been made, and no assertion is made, as to whether any of the above might be applicable as prior art with regard to the present disclosure.

SUMMARY

Camera modules are being developed to include a dual lens. The dual lens camera module can realize or accommodate the required slimness by dividing a high performance lens into two (2) smaller lenses. Further, the dual lens camera module can take a high quality photograph in dark conditions by increasing the number of image sensors and eliminating background noise. The dual lens camera module can take wide-angle photographs or 3-dimensional photographs by utilizing the two (2) lenses. Further, the dual lens camera module can accurately measure a distance (or depth) and a size of a subject due to its binocular nature.

As a result of the above benefits, there is increasing interest in the dual lens camera module, and interest is also increasing in a drive structure for providing easy and effective (auto focus) AF and optical image stabilizer (OIS) functions for the dual lens camera module. For example, according to the related art, if a 3-axis driving method is applied to the dual lens camera module, there is a problem that the AF and OIS functions are applied simultaneously to a plurality of lenses.

Aspects of the present disclosure are to address at least the above-mentioned problems and/or disadvantages and to provide at least the advantages described below. Accordingly, an aspect of the present disclosure is to provide a camera module having a plurality of lenses and an electronic device having the same, and the camera module or the electronic device, can individually (or separately) control the function(s) for a plurality of lenses and simultaneously (or integrally) control the OIS function for the plurality of lenses.

In accordance with an aspect of the present disclosure, a camera module or camera having a plurality of lenses is provided. The camera module includes a plurality of lens barrels configured to include the plurality of lenses, a moving frame configured to launch the plurality of lens barrels, to move the plurality of lens barrels in an optical axis direction, and to move the plurality of lens barrels in a direction at least one of a first direction and a second direction perpendicular to the optical axis direction, a fixed frame configured to movably support the moving frame, and a base configured to fix the fixed frame and to include a plurality of image sensors displaced from the plurality of lenses in the optical axis direction.

In accordance with another aspect of the present disclosure, a camera module or camera having a plurality of lenses is provided. The camera module includes a plurality of lens barrels configured to include the plurality of lenses, a moving frame configured to launch the plurality of lens barrels, to move the plurality of lens barrels in an optical axis direction, and to move the plurality of lens barrels in a direction at least one of a first direction and a second direction perpendicular to the optical axis direction, a fixed frame configured to movably support the moving frame, a base configured to fix the fixed frame, a plurality of image sensors displaced from the plurality of lenses in the optical axis direction, and a rotation protector located between the moving frame and the fixed frame. The rotation protector is configured to protect the moving frame from rotating in the second direction when the moving frame moves in the first direction and to protect the moving frame from rotating in the first direction when the moving frame moves in the second direction.

In accordance with another aspect of the present disclosure, an electronic device is provided. The electronic device includes a housing and a camera module or camera of which at least a part thereof is installed at a side of the housing. The camera module or camera may include a plurality of lens barrels configured to include the plurality of lenses, a moving frame configured to launch the plurality of lens barrels, to move the plurality of lens barrels in an optical axis direction, and to move the plurality of lens barrels in a direction at least one of a first direction and a second direction perpendicular to the optical axis direction, a fixed frame configured to movably support the moving frame, and a base configured to fix the fixed frame and to include a plurality of image sensors displaced from the plurality of lenses in the optical axis direction.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, operation, element, component, or combination thereof described in a specification and does not exclude presence or addition of at least one other characteristic, numeral, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate various embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a television (TV), a digital video disk (DVD) player, audio equipment, a refrigerator, an air conditioner, a vacuum cleaner, an oven, a microwave, a washing machine, an air cleaner, a set-top box, a TV box (e.g., Samsung Home- Sync™, Apple TV™, Google TV™, etc.), a game console, an electronic dictionary, an electronic key, a camcorder, or an electronic picture frame.

According to some embodiments, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary and not to be considered as a limitation of this disclosure.

Figure 1:
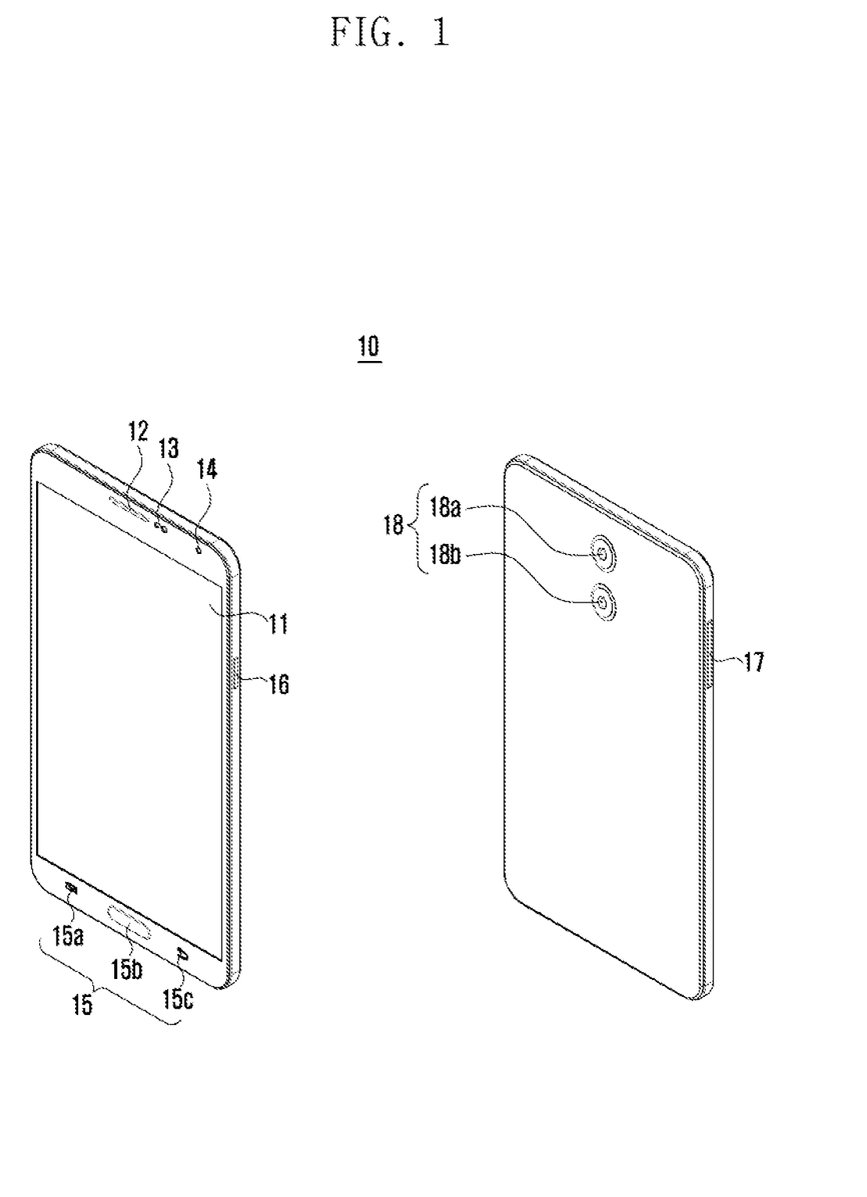
FIG. 1 is a schematic drawing illustrating an electronic device according to various embodiments of the present disclosure.

FIG. 1 is a schematic drawing illustrating the front and rear sides of an electronic device according to various embodiments of the present disclosure.

Referring to FIG. 1, the electronic device 10 according to an embodiment of the present disclosure may include a display unit 11 located at the front side of the electronic device 10; a speaker 12 (for example, receiver), illumination sensor 13, and front camera 14 located at the top of the display unit 11; and a plurality of keys 15 located at the bottom of the display unit 11. For example, the plurality of keys 15 may include a menu key 15a, home key 15b, and cancel key 15c.

A power key 16 and a volume key 17 may be located at a side of the electronic device 10. Further, a rear camera 18 may be located at the rear side of the electronic device 10. For example, at least a part of the rear camera 18 can be installed in a housing of the electronic device 10. The rear camera 18 may include a dual lens 18. The dual lens 18 may include at least a pair or lenses 18a and 18b, as illustrated in FIG. 1.

The rear camera 18 according to an embodiment of the present disclosure can provide an auto focus (AF) function and an optical image stabilizer (OIS) function. In more detail, the electronic device 10 can control the function individually for a plurality of lenses 18a and 18b. Further, the electronic device 10 can control the OIS function simultaneously (or integrally) for the plurality of lenses 18a and 18b. Namely, the plurality of lens 18a and 18b may move individually in an optical axis direction and may move simultaneously in a direction of at least one of a first direction and a second direction perpendicular to the optical axis.

In the meantime, the electronic device 10 shown in FIG. 1 is an example and for illustrative purpose, and thus, the configuration of the electronic device 10 is not limited to the example of FIG. 1. Although the electronic device 10 of FIG. 1 shows a bar type smartphone, the electronic device 10 can be a folder type, slide type, or flexible type mobile phone.

Further, although the electronic device 10 of FIG. 1 shows that the rear camera 18 includes two (2) or a pair of lenses, the rear camera 18 of the electronic device 10 may include more than two (2) lenses. The front camera 14 of the electronic device 10 may also include a multi-lens.

Further, although the electronic device 10 of FIG. 1 shows a smartphone, the electronic device 10 according to an embodiment of the present disclosure may include any electronic device with a camera or camera module installed.

Figure 2:
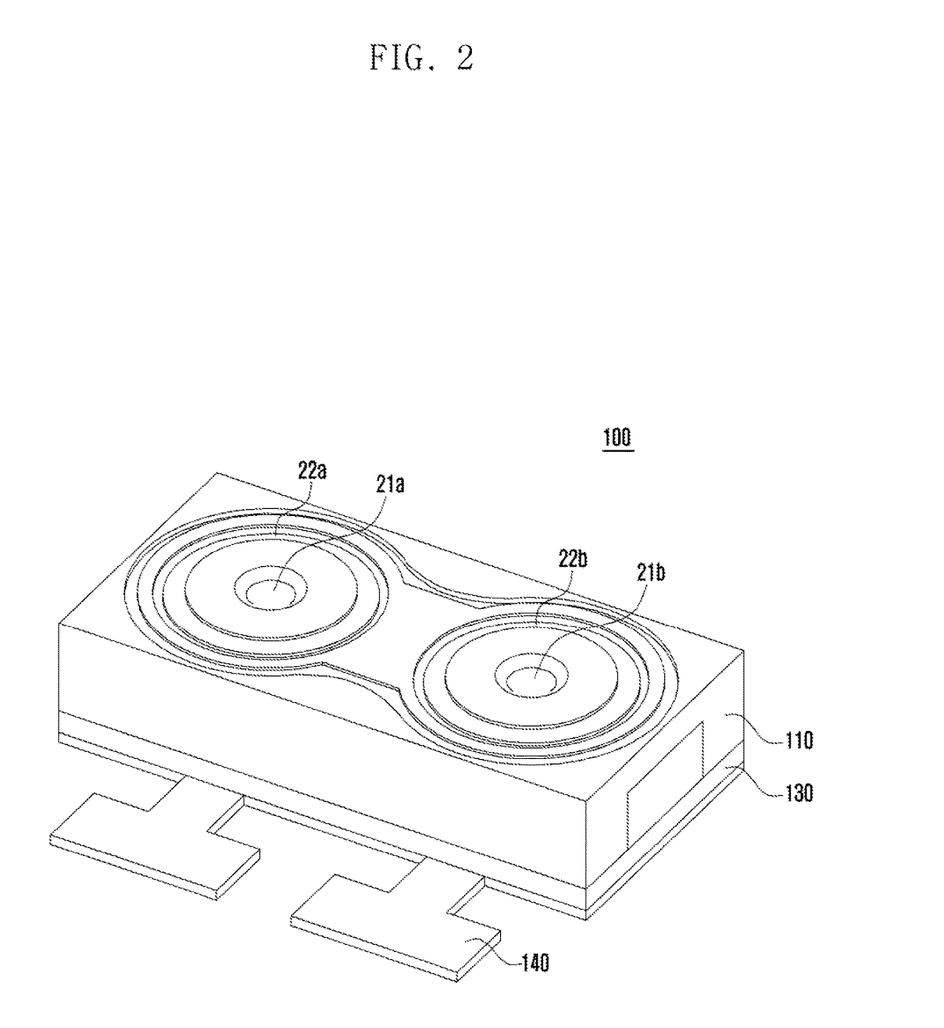
FIG. 2 is a schematic drawing illustrating a camera module according to various embodiments of the present disclosure.
Figure 3:
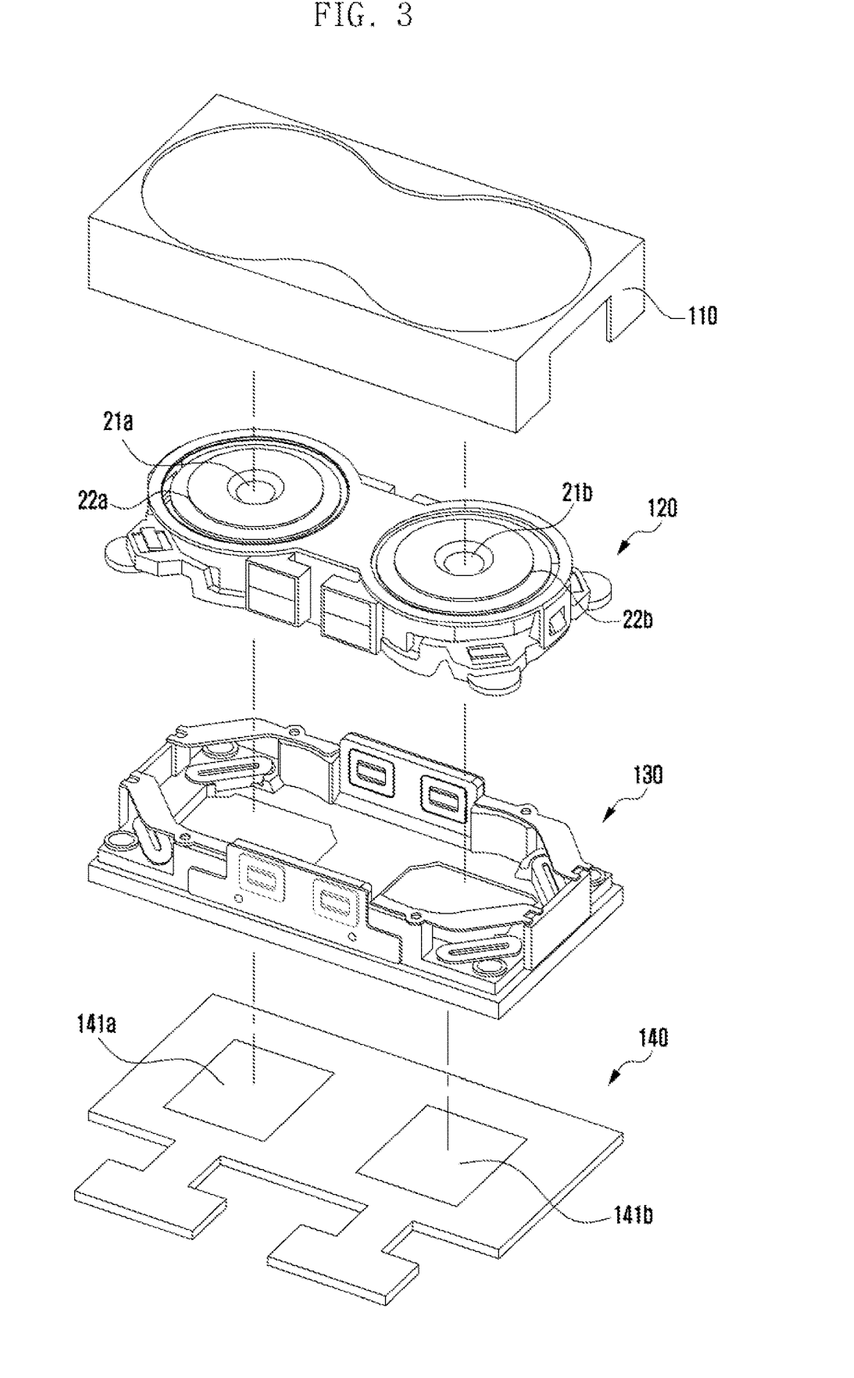
FIG. 3 is an exploded view illustrating the camera module of FIG. 2 according to various embodiments of the present disclosure.
Figure 4:
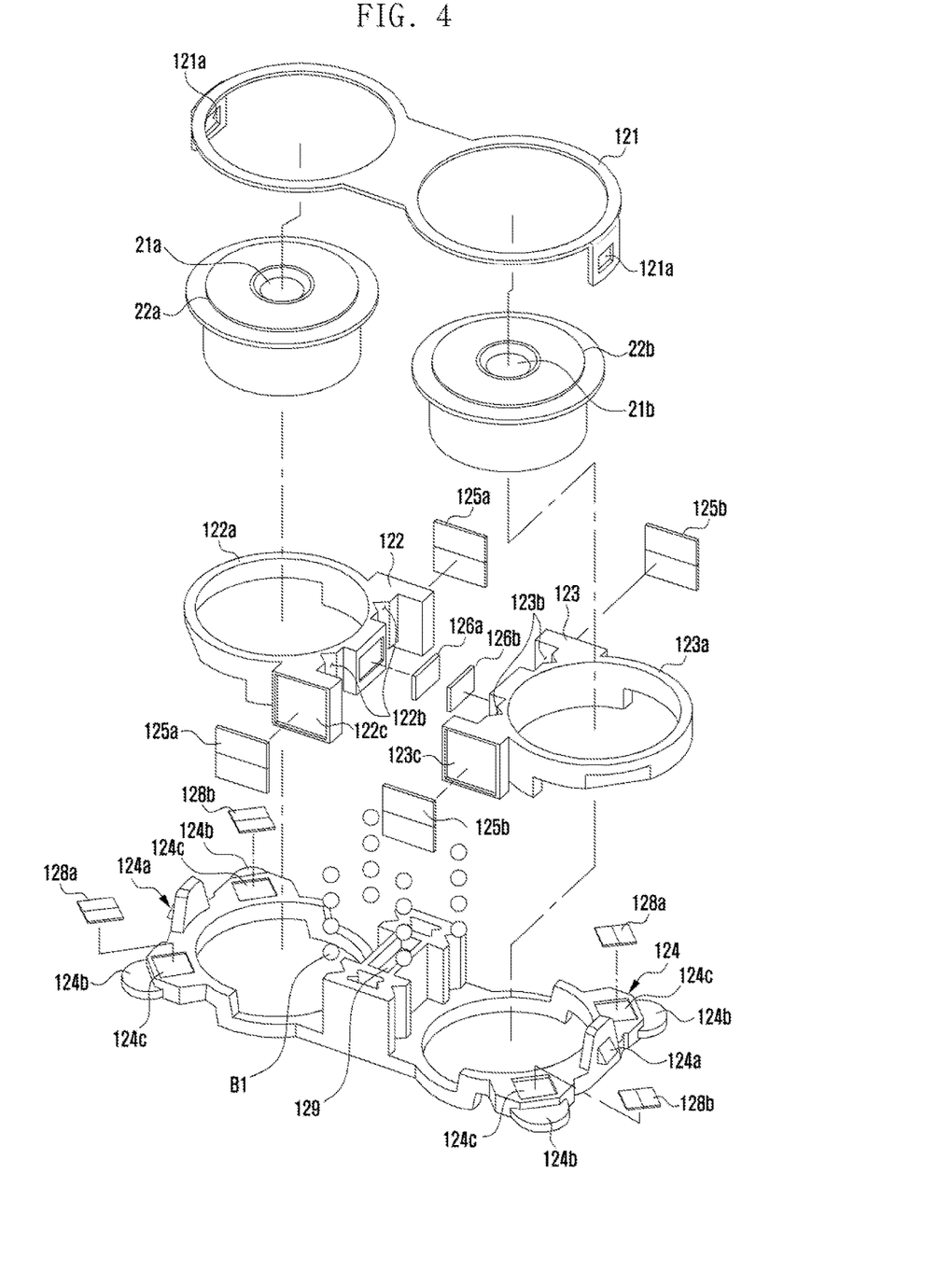
FIG. 4 is an exploded view illustrating the moving frame of FIG. 3 according to various embodiments of the present disclosure.
Figure 5:
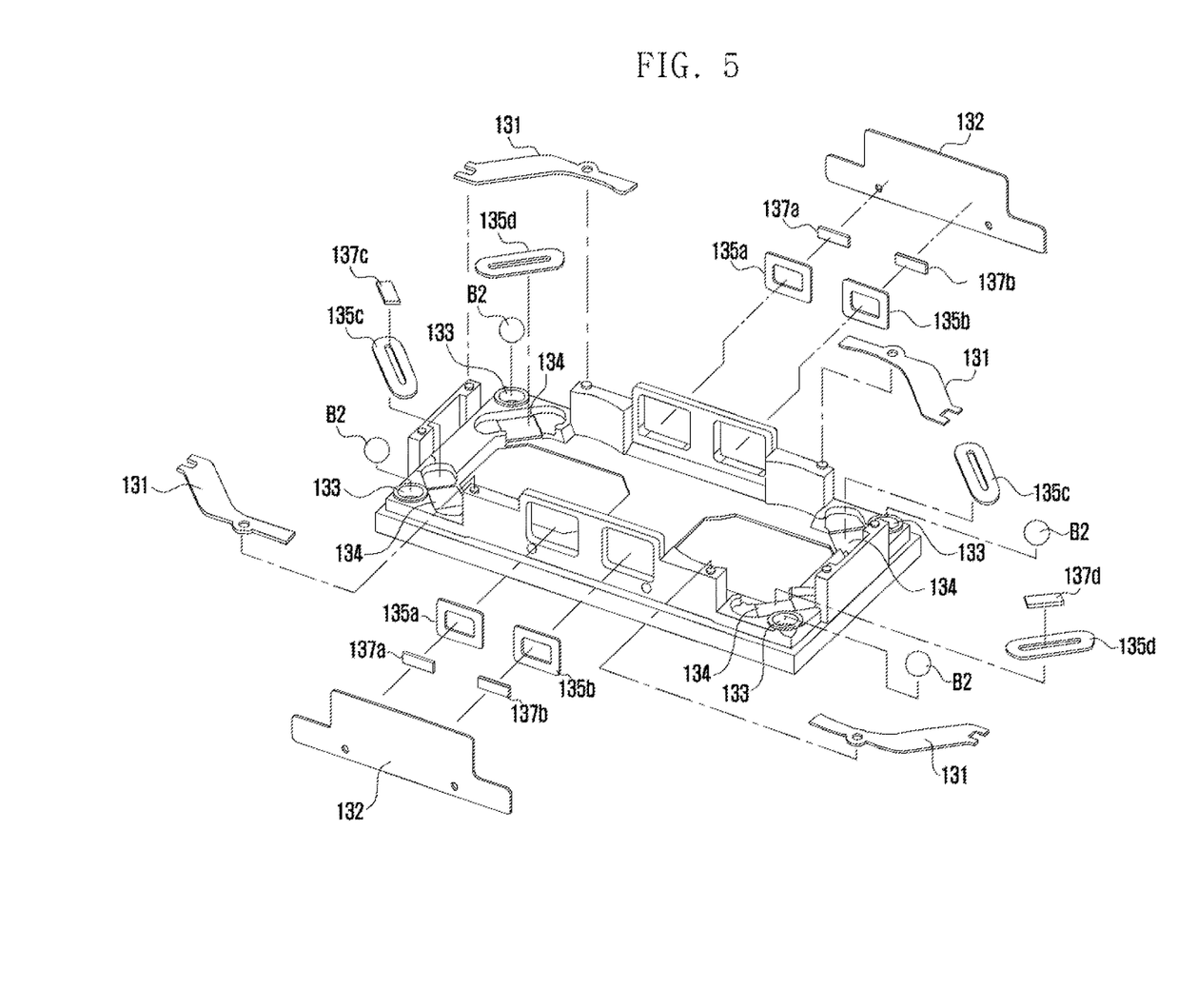
FIG. 5 is an exploded view illustrating the fixed frame of FIG. 3 according to various embodiments of the present disclosure.

FIG. 2 is a schematic drawing illustrating a camera module according to various embodiments of the present disclosure. FIG. 3 is an exploded view illustrating the camera module of FIG. 2 according to various embodiments of the present disclosure. FIG. 4 is an exploded view illustrating the moving frame of FIG. 3 according to various embodiments of the present disclosure. FIG. 5 is an exploded view illustrating the fixed frame of FIG. 3 according to various embodiments of the present disclosure.

Referring to FIGS. 2, 3, 4, and 5, the camera module 100 (for example, rear camera 18 of FIG. 1) according to an embodiment of the present disclosure may include a housing 110, plurality of lens barrels 22a and 22b, moving frame 120 (shown in FIG. 3), fixed frame 130 (shown in FIGS. 2 and 3), and base 140 (shown in FIGS. 2 and 3).

The housing 110 can protect at least a part of the moving frame 120 and at least a part of the fixed frame 130. For example, the housing 110 may be formed with a shield can.

Referring to FIGS. 2 and 3, the plurality of lens barrels 22a and 22b may include, respectively, a plurality of lenses 21a and 21b. The plurality of lens barrels 22a and 22b may be launched on the moving frame 120.

With reference to FIG. 3, the moving frame 120 can move the plurality of lens barrels 22a and 22b in at least three (3) directions. For example, the moving frame 120 can move the plurality of lens barrels 22a and 22b in an optical axis direction (for example, Z-axis direction) and in a direction of at least one of a first direction (for example, X-axis direction) and a second direction (Y-axis direction) perpendicular to the optical axis direction (Z-axis direction). Namely, the moving frame 120 can perform an AF function by moving the plurality of lens barrels 22a and 22b and an integrated OIS function by moving the plurality of lens barrels 22a and 22b in a direction at least one of the first direction and the second direction. In this case, the first direction may be perpendicular to the second direction, however, the present disclosure is not limited to this example. It is possible to configure a processor (not shown) to control for moving the plurality of lens barrels 22a and 22b, to generate vibration(s) for user feedback, by controlling the frequencies, speeds and/or directions of movement of the lens barrels 22a and 22b, as well as to enhance sound generated by the speaker 12 of the electronic device 10.

Here, the structure of the moving frame 120 will be described in more detail with reference to FIGS. 3 and 4.

With reference to FIGS. 3 and 4, the moving frame 120 may include a cover 121, first moving frame 122, second moving frame 123, and third moving frame 124.

The cover 121 can cover the upper parts of the first moving frame 122 and the second moving frame 123. For example, the cover 121 can protect the first moving frame 122 and the second moving frame 123 from being separated externally or to the outside. Namely, the cover 121 can restrict movement of the first moving frame 122 and the second moving frame 123 so that they move in the optical axis direction within a predetermined range (for example, 0.3 mm) The cover 121 may include a hole 121a in which a projection 124a formed at a side of the third moving frame 124 is inserted. However, the cover 121 is not limited to include the hole 121a. For example, the cover 121 can be combined with the third moving frame 124 by using various well-known combining methods.

Referring to FIG. 4, the first moving frame 122 may be formed with a first launcher 122a in which a first lens barrel 22a including a first lens 21a is launched. The first moving frame 122 can move the first lens barrel 22a in the optical axis direction (Z-axis direction). For this, a first magnet 125a may be disposed on the first moving frame 122 corresponding to a first drive coil 135a (shown in FIG. 5) located at the fixed frame 130 (shown in FIG. 3). The first magnets 125a may have a structure of which the N-pole and S-pole are arranged according to the optical axis direction. The first magnets 125a may be formed with a member generating a magnetic force without an electric power such as a permanent magnet. The first moving frame 122 may be formed with a first groove 122c for inserting the first magnets 125a.

Referring to FIG. 4, a plurality of ball bearings B1 can be disposed between the first moving frame 122 and the third moving frame 124. At least one of the first moving frame 122 and the third moving frame 124 may be equipped with the ball bearing B1 and formed with a first guide groove 122b enabling the first moving frame 122 to move in the optical axis direction (Z-axis direction). The first guide groove 122b is formed in a shape extending in the optical axis direction, and any force applied to the ball bearings B1 in a direction other than the optical axis direction can be removed. For example, the first guide groove 122b enables the first moving frame 122 to move securely in the optical axis direction without having or causing a discrepancy in the second direction.

Referring to FIG. 4, a first yoke 126a formed with a conductive material (for example, metal) may be disposed at a side of the first moving frame 122. The first yoke 126a is disposed corresponding to a fifth magnet 129 located at the third moving frame 124 and can restrict the first moving frame 122 to move in the first direction. In more detail, the first yoke 126a can be magnetized by the fifth magnet 129. In this case, an attracting force can be generated between the first yoke 126a and the fifth magnet 129. According to the attracting force, the first moving frame 122 can be restricted to move securely in the first direction.

Referring to FIG. 4, the second moving frame 123 can move the second lens barrel 22b including the second lens 21b in the optical axis direction. For this, the second moving frame 123 may include a second launcher 123a for launching the second lens barrel 22b, second guide groove 123b for guiding the second moving frame 123 in the optical axis direction, second magnet 125b disposed corresponding to a second drive coil 135b (shown in FIG. 5) located at the fixed frame 130 (shown in FIG. 3), second groove 123c for inserting the second magnet 125b, and second yoke 126b located corresponding to the fifth magnet 129. Like this, the second moving frame 123 has a structure similar to that of the first moving frame 122. Accordingly, a detailed description of the second moving frame 123 will be omitted to avoid repetition of the description.

Referring to FIG. 4, the third moving frame 124 can move in a first direction (X-axis) and a second direction (Y-axis) perpendicular to the optical axis direction. For this, the third moving frame 124 can be supported by the fixed frame 130 (shown in FIG. 3) movably in the first direction and the second direction.

Referring to FIGS. 4 and 5, a plurality of ball bearings B2 may be disposed between the third moving frame 124 and the fixed frame 130 (shown in FIG. 3). The third moving frame 124 may be formed with a plurality of grooves 124b for inserting the plurality of ball bearings B2. The plurality of grooves 124b may have a size greater than that of the plurality of ball bearings B2 so that the third moving frame 124 can move freely in a direction perpendicular to the optical axis direction.

Referring to FIG. 4, the third moving frame 124 may include a plurality of magnets 128a and 128b disposed nearby the plurality of grooves 124b. The plurality of magnets 128a and 128b may include at least one third magnet 128a for a movement in the first direction and at least one fourth magnet 128b for a movement in the second direction. For example, each of the third magnet 128a and the fourth magnet 128b may include two (2) magnets disposed diagonally. However, the embodiment of the present disclosure may not be limited to this example, and the third magnet 128a and the fourth magnet 128b may include only one magnet or more than two (2) magnets.

Referring to FIGS. 4 and 5, the third magnet 128a and the fourth magnet 128b can be disposed respectively at a third drive coil 135c and a fourth drive coil 135d of the fixed frame 130.

Referring to FIG. 4, the third magnet 128a and the fourth magnet 128b may have the N-pole and S-pole arranged in a direction perpendicular to the optical axis direction. For example, the arrangement direction of the N-pole and S-pole of the third and fourth magnets 128a and 128b may be perpendicular to the arrangement direction of the N-pole and S-pole of the first magnet 125a. The third and fourth magnets 128a and 128b may be formed with a member for generating a magnetic force without supplying an electric power such as a permanent magnet.

Referring to FIGS. 3 and 4, the third moving frame 124 may be formed with a plurality of grooves 124c for inserting the third and fourth magnets 128a and 128b. The fixed frame 130 may be fixed to the base 140. Namely, relative locations of the fixed frame 130 and the base 140 do not change. For this, the fixed frame 130 may be fixed directly to the base 140 or indirectly through other members.

Referring to FIG. 3, the fixed frame 130 can support the moving frame 120 movably and provide a driving power for the moving frame 120 to move in the optical axis direction and the second direction.

The structure of the fixed frame 130 will be described in more detail with reference to FIGS. 3 and 5.

With reference to FIGS. 3 and 5, the fixed frame 130 may include a separation protector 131 for preventing the third moving frame 124 (shown in FIG. 4) from being separated in the optical axis direction.

The fixed frame 130 may be formed with a plurality of grooves 133 for inserting a plurality of ball bearings B2. The plurality of grooves 133 may have a diameter similar to that of the plurality of ball bearings B2.

Referring to FIGS. 3, 4 and 5, the fixed frame 130 may include a plurality of drive coils 135a, 135b, 135c, and 135d for providing a driving power in the optical axis direction and a driving power in the second direction. For example, the fixed frame 130 may include a first drive coil 135a for moving the first moving frame 122 in the optical axis direction, second drive coil 135b for moving the second moving frame 123 in the optical axis direction, third drive coil 135c for moving the third moving frame 124 in the first direction, and fourth drive coil 135d for moving the third moving frame 124 in the second direction. The first drive coil 135a to fourth drive coil 135d may be configured in pairs, however, the embodiments of the present disclosure are not limited to only this example.

Referring to FIGS. 4 and 5, the first drive coil 135a to fourth drive coil 135d may receive an electric power from a printed circuit board (not shown) located at a side of the fixed frame 130 (shown in FIG. 3) in order to move the first to third moving frames 122, 123, and 124.

Referring to FIGS. 4 and 5, if an electric power is supplied to the first drive coil 135a, the first magnet 125a located at the first moving frame 122 can move in the optical axis direction. Further, if an electric power is supplied to the second drive coil 135b, the second magnet 125b located at the second moving frame 123 can move in the optical axis direction. According to the electric current direction supplied to the first drive coil 135a and the second drive coil 135b, the first magnet 125a located at the first moving frame 122 and the second magnet 125b located at the second moving frame 123 can move positively or negatively in the optical axis direction.

Further referring to FIGS. 4 and 5, if an electric power is supplied to the third drive coil 135c, the third magnet 128a can move positively or negatively in the first direction according to the electric current direction supplied to the third drive coil 135c. If an electric power is supplied to the third drive coil 135c, the fourth magnet 128b can move positively or negatively in the second direction according to the electric current direction supplied to the third drive coil 135c. In the meantime, although it has been described that the third drive coil 135c controls the movement in the first direction and the fourth drive coil 135d controls the movement in the second direction, according to another embodiment the third moving frame 124 can move in the first direction or the second direction by proper adjustment of the amount of electric power (or electric current) supplied to the third drive coil 135c and fourth drive coil 135d.

In the meantime, the fixed frame 130 (shown in FIG. 3) may include a first sensor 137a and a second sensor 137b for detecting movements of the first moving frame 122 and the second moving frame 123 in the optical axis direction. The first and second sensors 137a and 137b may be magnetic sensors. The magnetic sensors can output an electric signal proportional to the intensity of a magnetic field generated by the Hall Effect.

Referring to FIGS. 4 and 5, the first sensor 137a and the second sensor 137b according to an embodiment of the present disclosure may be formed in a pair. The pair of first sensors 137a can identify a movement and a location of the first moving frame 122 securely by adding detected densities of magnetic flux. The pair of fourth sensors 137d can identify a movement and a location of the second moving frame 123 securely by adding detected densities of magnetic flux.

Further referring to FIGS. 4 and 5, a third sensor 137c for detecting a movement of the third moving frame 124 in the first direction and a fourth sensor 137d for detecting a movement of the third moving frame 124 in the second direction can be disposed on the fixed frame 130. The third sensor 137c and the fourth sensor 137d may be magnetic sensors.

Referring to FIGS. 4 and 5, the third and fourth sensors 137c and 137d can detect the movement and location of the third moving frame 124 in the first direction and the second direction respectively by using the third magnet 128a and the fourth magnet 128b. For example, according to the movement of the third magnet 128a in the first direction, the distance between the center of the third magnet 128a and the center of the third sensor 137c may change. According to the change of distance, a signal detected by the third sensor 137c (for example, magnetic flux) changes. The third sensor 137c can detect a movement and a location of the third magnet 128a in the first direction from the changed magnetic flux.

The fourth sensor 137d can detect a movement and a location of the fourth magnet 128b by the same method as the third sensor 137c.

Referring to FIG. 5, the third sensor 137c and the fourth sensor 137d are shown as a single component. In FIG. 4 the movements and locations of the third magnet 128a and the fourth magnet 128b are described as being detected by a sensor; however, the embodiment of the present disclosure is not limited to this example. For example, the third sensor 137c and the fourth sensor 137d may be formed with a plurality of sensors (for example, a pair of sensors). The camera module 10 may generate a location deviation (hereafter, rotation deviation) because of the rotation in the second direction or the first direction when the third moving frame 124 moves in the first direction or second direction. The rotation deviation may cause deterioration of image quality in case of a high sensitivity lens. Therefore, an embodiment of the present disclosure can detect the rotation deviation by using a plurality of third sensors 137c and a plurality of fourth sensors 137d, and compensate for the detected rotation deviation.

Referring to FIGS. 3, 4 and 5, the fixed frame 130 may include a first drive coil 135a, second drive coil 135b, and a protecting cover 132 for preventing separation of the first sensor 137a and the second sensor 137b.

Referring to FIGS. 4 and 5, at least one third yoke 134 formed with a conductive material (for example, metal) may be disposed on the fixed frame 130 (shown in FIG. 3). The third yoke 134 is disposed corresponding to the third magnet 128a and the fourth magnet 128b of the third moving frame 124 and can restrict the third moving frame 124 in the optical axis direction. For example, the third yoke 134 may be located at the bottom of the third drive coil 135c and the fourth drive coil 135d. The third yoke 134 can be magnetized by the third magnet 128a and the fourth magnet 128b. In this case, an attracting force can be generated between the third yoke 134 and the third and fourth magnets 128a and 128b. According to the attracting force, the third moving frame 124 can be restricted in the optical axis direction without discrepancy.

Although not shown in the drawings, the fixed frame 130 may include a printed circuit board (PCB) for supplying an electric power (voltage and current) to a plurality of drive coils 135a, 135b, 135c, and 135d and the plurality of sensors 137a, 137b, 137c, and 137d in order to move the first to third moving frames 122, 123, and 124. The PCB may be a flexible printed circuit board (FPCB).

With reference to FIGS. 2 and 3, the base 140 is fixed to the bottom of the fixed frame 130, and it may include a plurality of image sensors 141a and 141b displaced respectively from the plurality of lenses 21a and 21b in the optical axis direction. The base 140 can be connected to a printed circuit board (not shown). The base 140 can be connected to a mainboard (not shown) of the electronic device 10 at which the camera module 100 is installed.

The camera module 100 (shown in FIG. 2) according to the above embodiment of the present disclosure has a two (2)-layer structure of moving frames to provide an AF function and an OIS function. Namely, the first moving frame 122 and the second moving frame 123 respectively moving the first and second lens barrels 22a and 22b in the optical axis direction can be located at the same location on the top of the third moving frame 124 simultaneously moving the plurality of lens barrels 22a and 22b in the first direction and the second direction.

The above detailed embodiment has been described with a voice coil motor (VCM) method using an electromagnetic force generated between a drive coil and a magnet for the movement of moving frame 120. However, the present disclosure is not limited to this embodiment and may utilize various methods of moving a moving frame, such as an ultrasonic motor method using a piezoelectric element and a method of driving the moving frame by applying an electric current to a shape memorizing alloy.

Figure 6:
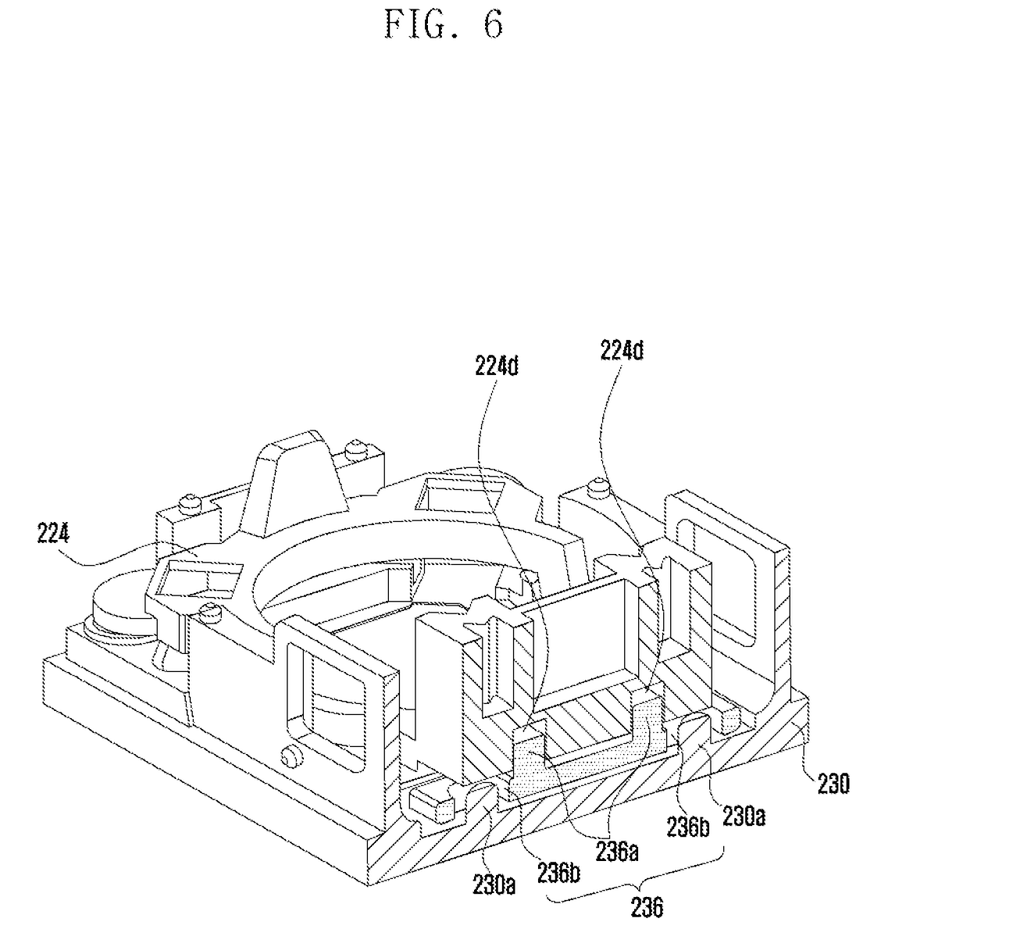
FIGS. 6, 7, and 8 are schematic drawings illustrating a camera module including a rotation protector according to various embodiments of the present disclosure.
Figure 7:
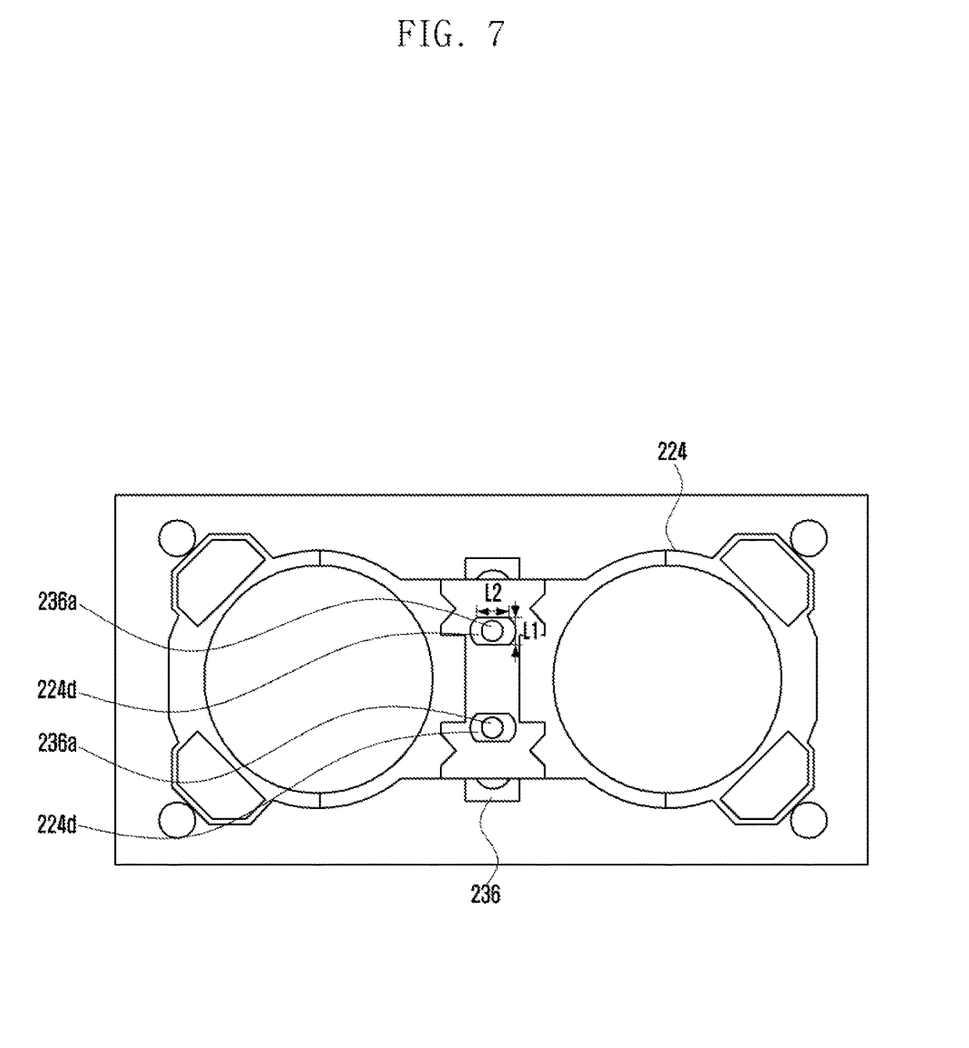
Figure 8:
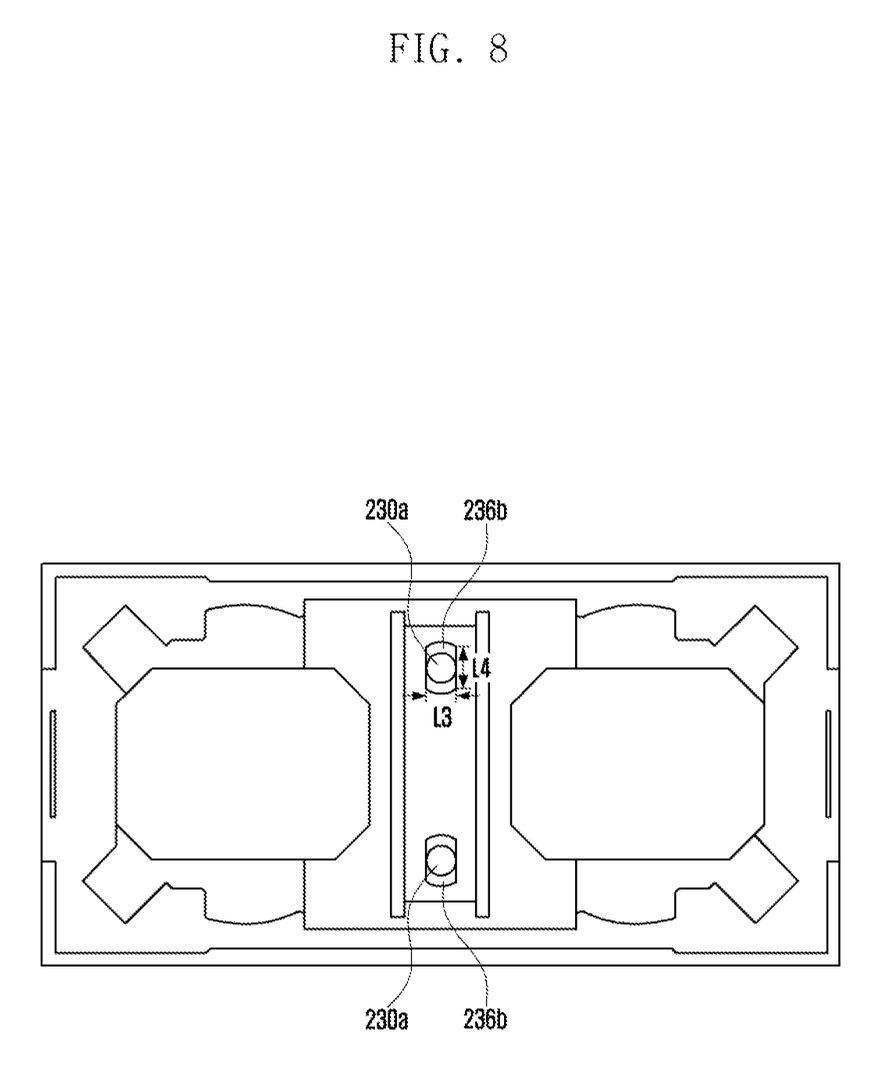

FIGS. 6, 7, and 8 are schematic drawings illustrating a camera module including a rotation protector according to various embodiments of the present disclosure.

Referring to FIGS. 6, 7, and 8, the camera module according to an embodiment of the present disclosure may include a rotation protector 236.

The rotation protector 236 can prevent a rotating movement generated according to a free movement of third moving frame 224 in a direction vertical to the optical axis direction. For example, the rotation protector 236 can prevent the third moving frame 224 from rotating in the second direction while moving in the first direction. Alternatively, the rotation protector 236 can prevent third moving frame 224 from rotating in the first direction while moving in the second direction.

The rotation protector 236 may include a first projection 236a for guiding the third moving frame 224 to move in the first direction and a guide hole 236b for guiding the third moving frame 224 to move in the second direction.

Referring to FIGS. 6, 7 and 8, first projection 236a can extend in the optical axis direction. The first projection 236a may have a cylindrical shape. The first projection 236a can be inserted in a guide groove 224d of the third moving frame 224. The guide groove 224d may have a long elliptical shape in the first direction as shown in FIG. 7. The width L1 of the guide groove 224d may be similar to the width of the projection 236a. The length L2 of the guide groove 224d may be a distance in which the third moving frame 224 can move in the first direction (for example, 0.3 mm).

The first projection 236a can move in the first direction along the guide groove 224d. Namely, the guide groove 224d can remove any force applied to the third moving frame 224 in a direction other than the first direction. Accordingly, the third moving frame 224 can move securely in the first direction without rotating in the second direction.

The guide hole 236b may have a long elliptical shape in the second direction as shown in FIG. 8. A second projection 230a formed at a side of fixed frame 230 can be inserted into the guide hole 236b. The width L3 of the guide hole 236b may be similar to the diameter of the second projection 230a. The length L3 of the guide hole 236b may be a distance in which the third moving frame 224 can move in the second direction (for example, 0.3 mm).

The guide hole 236b can guide the third moving frame 224 so that the third moving frame 224 can move securely in the second direction. Namely, the guide hole 236b can remove any force applied to the third moving frame 224 in a direction other than the second direction. Accordingly, the third moving frame 224 can move securely in the second direction without rotating in the first direction.

Although it has been described that the third moving frame 224 moves in the first direction without rotating in second direction by the first projection 236a and that the third moving frame 224 is guided in the second direction without rotating in the first direction by the guide hole 236b, however, according to another embodiment, the third moving frame 224 can move in the second direction without rotating in the first direction by the first projection 236a and can move in the first direction without rotating in the second direction by the guide hole 236b.

The term "module" used in the present disclosure may include a unit configured with hardware, software, or firmware and can be used inter-compatibly with terms such as logic, logical block, component, or circuit. The "module" can be an integrated component, minimum unit performing at least one function, or part of component. The "module" can operate mechanically or electronically, and it may include an application-specific integrated circuit (ASIC) chip, field-programmable gate arrays (FPGAs), or programmable logic equipment which are already known or to be developed. At least a part of a device (for example, modules or their functions) and a method (for example, operations) according to various embodiments of the present disclosure can be implemented by a command stored in a program module form in a computer-readable recording media. If the command is executed by a processor, the processor can perform a function corresponding to the command. The computer-readable recording media may include a hard disk, floppy disk, magnetic media (for example, magnetic tape), optical recording media (for example, compact disc-read only memory (CD-ROM) and digital versatile disc (DVD)), magneto-optical media (for example, floptical disk), and internal memory. The command may include a code generated by a compiler or a code executable by an interpreter. The module or program module according to various embodiments of the present disclosure may include at least one of the above elements, and some of the elements can be omitted or another element can be added. Operations performed by a module, program module, or other elements according to various embodiments of the present disclosure can be executed sequentially, in parallel, repeatedly, or in a heuristic manner. Further, some operations can be executed in a different order or another operation can be added.

As described above, various embodiments of the present disclosure can provide an AF function of controlling a plurality of lenses individually and an OIS function of controlling the plurality of lenses simultaneously. Therefore, a high quality photograph or video can be obtained according to various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A camera comprising:
   a plurality of lenses;
   a plurality of lens barrels including the plurality of lenses;
   a moving frame for:
      launching the plurality of lens barrels,
      moving the plurality of lens barrels individually in an optical axis direction to provide an auto focus (AF) function, and
      moving the plurality of lens barrels simultaneously in a direction of at least one of a first direction or a second direction perpendicular to the optical axis direction to provide an optical image stabilizer (OIS) function;
   a fixed frame for movably supporting the moving frame;
   a base for fixing the fixed frame; and
   a plurality of image sensors displaced from the plurality of lenses in the optical axis direction,
      wherein the plurality of lens barrels comprises a first lens barrel and a second lens barrel,
      wherein the moving frame comprises:

a first moving frame for moving the first lens barrel in the optical axis direction and comprising a first magnet, and
a second moving frame for moving the second lens barrel in the optical axis direction and comprising a second magnet, and
wherein the fixed frame comprises:
a first drive coil located corresponding to the first magnet and configured to provide a driving power for moving the first moving frame in the optical axis direction, and
a second drive coil located corresponding to the second magnet and configured to provide a driving power for moving the second moving frame in the optical axis direction.

2. The camera of claim 1, wherein the moving frame further comprises:
a third moving frame for moving the first lens barrel and the second lens barrel in a direction of at least one of the first direction or the second direction.

3. The camera of claim 2,
wherein the fixed frame further comprises:
a third drive coil configured to provide a driving power for moving the third moving frame in the first direction; and
a fourth drive coil configured to provide a driving power for moving the third moving frame in the second direction, and
wherein the third moving frame comprises a third magnet and a fourth magnet corresponding respectively to the third drive coil and the fourth drive coil.

4. The camera of claim 3,
wherein the third moving frame comprises a fifth magnet,
wherein the first moving frame is located corresponding to the fifth magnet and further comprises a first yoke formed with a conductive material,
wherein the second moving frame is located corresponding to the fifth magnet and further comprises a second yoke formed with a conductive material, and
wherein the fixed frame is located corresponding to the third magnet and the fourth magnet and further comprises a third yoke formed with a conductive material.

5. The camera of claim 3, further comprising:
a first sensor located on the fixed frame corresponding to the first magnet and configured to detect a movement and a location of the first moving frame in the optical axis direction;
a second sensor located on the fixed frame corresponding to the second magnet and configured to detect a movement and a location of the second moving frame in the optical axis direction;
a third sensor located on the fixed frame corresponding to the third magnet and configured to detect a movement and a location of the third moving frame in the first direction; and
a fourth sensor located on the fixed frame corresponding to the fourth magnet and configured to detect a movement and a location of the third moving frame in the second direction.

6. The camera of claim 5, wherein the first, second, third, and fourth sensors are magnetic sensors.

7. The camera of claim 5, wherein the first sensor and the second sensor are formed in a pair.

8. The camera of claim 5,
wherein the third sensor and the fourth sensor are configured with a plurality of sensors,
wherein, when the third moving frame moves in the first direction, the camera detects and compensates a location deviation generated by rotation in the second direction with the plurality of third sensors, and
wherein, when the third moving frame moves in the second direction, the camera detects and compensates a location deviation generated by rotation in the first direction with the plurality of fourth sensors.

9. The camera of claim 3, wherein the fixed frame further comprises a printed circuit board configured to supply an electric power to the first drive coil, the second drive coil, the third drive coil, and the fourth drive coil in order to move the first moving frame, the second moving frame, and the third moving frame.

10. The camera of claim 2, wherein the fixed frame further comprises a separation protector for protecting the third moving frame from being separated in the optical axis direction.

11. The camera of claim 2, further comprising:
a rotation protector located between the third moving frame and the fixed frame,
wherein the rotation protector protects the third moving frame from rotating in the second direction when the third moving frame moves in the first direction and protects the third moving frame from rotating in the first direction when the third moving frame moves in the second direction.

12. The camera of claim 11, wherein the rotation protector further comprises:
a first projection configured to extend in the optical axis direction so that the third moving frame does not rotate in the second direction but rotates in the first direction; and
a guide hole formed in a long ellipse in the second direction so that the third moving frame does not rotate in the second direction but rotates in the first direction.

13. The camera of claim 12,
wherein the third moving frame comprises a guide groove formed in a long ellipse in the first direction, and
wherein the first projection is formed as a cylinder having a diameter similar to a width of the guide groove and moves in the first direction by insertion into the guide groove.

14. The camera of claim 12,
wherein the fixed frame comprises a second projection formed as a cylinder having a diameter similar to a width of the guide hole, and
wherein the fixed frame is configured to move in the second direction by insertion into the guide hole.

15. The camera of claim 1, wherein the moving frame further comprises a cover for protecting a separation of the first moving frame and the second moving frame.

16. A camera comprising:
a plurality of lenses;
a plurality of lens barrels including the plurality of lenses;
a moving frame for:
launching the plurality of lens barrels,
moving the plurality of lens barrels individually in an optical axis direction to provide an auto focus (AF) function, and
moving the plurality of lens barrels simultaneously in a direction of at least one of a first direction or a second direction perpendicular to the optical axis direction to provide an optical image stabilizer (OIS) function;
a fixed frame for movably supporting the moving frame;
a base for fixing the fixed frame;

a plurality of image sensors displaced from the plurality of lenses in the optical axis direction; and
a rotation protector located between the moving frame and the fixed frame, wherein the rotation protector is for:
  protecting the moving frame from rotating in the second direction when the moving frame moves in the first direction, and
  protecting the moving frame from rotating in the first direction when the moving frame moves in the second direction,
wherein the rotation protector extends in the optical axis direction, and
wherein the rotation protector further comprises:
  a first projection configured to rotate the moving frame not in the second direction but in the first direction, and
  a guide hole formed in a long ellipse in the second direction and configured to rotate the moving frame not in the second direction but in the first direction.

17. The camera of claim 16,
wherein the moving frame comprises a guide groove formed in a long ellipse in the first direction,
wherein the fixed frame comprises a second projection formed as a cylinder having a diameter similar to the width of the guide hole,
wherein the fixed frame moves in the second direction by insertion into the guide hole, and
wherein the first projection is formed as a cylinder having a diameter similar to the width of the guide groove and configured to move in the first direction by inserting into the guide groove.

18. An electronic device comprising:
a housing; and
a camera comprising:
a plurality of lens barrels including the plurality of lenses;
a moving frame for:
  launching the plurality of lens barrels,
  moving the plurality of lens barrels individually in an optical axis direction to provide an auto focus (AF) function, and
  moving the plurality of lens barrels simultaneously in a direction of at least one of a first direction or a second direction perpendicular to the optical axis direction to provide an optical image stabilizer (OIS) function;
a fixed frame for movably supporting the moving frame;
a base for fixing the fixed frame; and
a plurality of image sensors displaced from the plurality of lenses in the optical axis direction,
  wherein at least a part of the camera is installed at a side of the housing,
  wherein the plurality of lens barrels comprises a first lens barrel and a second lens barrel;
wherein the moving frame comprises:
  a first moving frame for moving the first lens barrel in the optical axis direction and comprising a first magnet, and
  a second moving frame for moving the second lens barrel in the optical axis direction and comprising a second magnet, and
wherein the fixed frame comprises:
  a first drive coil located corresponding to the first magnet and configured to provide a driving power for moving the first moving frame in the optical axis direction, and
  a second drive coil located corresponding to the second magnet and configured to provide a driving power for moving the second moving frame in the optical axis direction.

19. The camera of claim 18,
wherein the camera is located between the moving frame and the fixed frame, and
wherein the camera further comprises a rotation protector for:
  protecting the moving frame from rotating in the second direction when the moving frame moves linearly in the first direction, or
  protecting the moving frame from rotating in the first direction when the moving frame moves linearly in the second direction.

* * * * *